United States Patent
Kawajiri

(10) Patent No.: US 8,830,498 B2
(45) Date of Patent: Sep. 9, 2014

(54) INFORMATION PROCESSING APPARATUS, METHOD AND PROGRAM FOR RECEIVING AN ELECTRONIC MAIL INCLUDING INFORMATION INSTRUCTING TO SKIP AN ERROR WHICH OCCURS IN A PRINTING APPARATUS

(71) Applicant: Canon Kabushiki Kaisha, Tokyo (JP)

(72) Inventor: Kensuke Kawajiri, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 13/785,898

(22) Filed: Mar. 5, 2013

(65) Prior Publication Data

US 2013/0258388 A1 Oct. 3, 2013

(30) Foreign Application Priority Data

Mar. 29, 2012 (JP) .................................. 2012-077801

(51) Int. Cl.
*G06K 15/00* (2006.01)
*G06K 15/02* (2006.01)
*G06F 3/12* (2006.01)

(52) U.S. Cl.
CPC .............. *G06K 15/02* (2013.01); *G06F 3/1288* (2013.01); *G06F 3/1292* (2013.01); *G06F 3/1259* (2013.01); *G06F 3/1234* (2013.01); *G06F 3/121* (2013.01)
USPC ........................................ 358/1.14; 358/1.15

(58) Field of Classification Search
CPC ... G06F 3/1204; G06F 3/1229; G06F 3/1292; G06F 3/121; G06F 3/1234; G06F 3/1259; H04N 1/00084; H04N 1/00204; H04N 1/00224; H04N 1/00344; H04N 2201/0094
USPC .................................................. 358/1.14, 1.15
See application file for complete search history.

(56) References Cited

U.S. PATENT DOCUMENTS

| 6,963,424 | B1 * | 11/2005 | Higuchi .......................... 358/1.9 |
| 2004/0137919 | A1 | 7/2004 | Biundo |
| 2005/0060649 | A1 | 3/2005 | Kimura et al. |
| 2006/0215212 | A1 * | 9/2006 | Tao ............................... 358/1.14 |

(Continued)

FOREIGN PATENT DOCUMENTS

| JP | 2001312392 A | 11/2001 |
| JP | 2004220606 A | 8/2004 |

OTHER PUBLICATIONS

U.S. Appl. No. 13/777,536, filed Feb. 26, 2013, Applicant: Hiroro Tsujii.
Office Action dated Apr. 2, 2014, in U.S. Appl. No. 13/777,536.

*Primary Examiner* — Benny Q Tieu
*Assistant Examiner* — Juan M Guillermety
(74) *Attorney, Agent, or Firm* — Fitzpatrick, Cella, Harper & Scinto

(57) ABSTRACT

An information processing apparatus (printing server) of one aspect of the present invention generates print data from a print target file attached to the electronic mail received from a mobile terminal via a network, and causes a printer designated in the electronic mail to execute printing based on the print data. In a case where a printer notifies a printing server of the occurrence of an error during the execution of printing based on print data, the printing server instructs the printer to automatically skip an error which has occurred, if it is designated in received electronic mail that the error should be automatically skipped.

8 Claims, 11 Drawing Sheets

(56) References Cited

U.S. PATENT DOCUMENTS

| | | |
|---|---|---|
| 2008/0068646 A1 | 3/2008 | Kobayashi |
| 2009/0128552 A1 | 5/2009 | Fujishita |
| 2012/0050784 A1* | 3/2012 | Kawaura .................... 358/1.14 |
| 2013/0215465 A1* | 8/2013 | Mutsuno et al. ............ 358/1.15 |

\* cited by examiner

F I G. 8

| No. | EXTENSION | FILE TYPE | APPLICATION NAME |
|---|---|---|---|
| 1 | pdf | PDF DOCUMENT | pdf SOFTWARE |
| 2 | jpg | IMAGE | jpg SOFTWARE |
| 3 | htm, html | HTML DOCUMENT | HTML SOFTWARE |
| 4 | txt | TEXT DOCUMENT | TEXT EDITING SOFTWARE |

F I G. 9

| PRINTER DRIVER | PRINTER NAME | AVOIDANCE MODE VALUE |
|---|---|---|
| LBP100 | 100 | 0 |
| LBP200 | 200 | 1 |
| LBP300 | 300 | 0 |
| ⋮ | ⋮ | ⋮ |
| LBP800 | 800 | 0 |
| LBP900 | 900 | 1 |

INFORMATION PROCESSING APPARATUS, METHOD AND PROGRAM FOR RECEIVING AN ELECTRONIC MAIL INCLUDING INFORMATION INSTRUCTING TO SKIP AN ERROR WHICH OCCURS IN A PRINTING APPARATUS

BACKGROUND OF THE INVENTION

1. Field of the Invention

The present invention relates to an information processing apparatus for printing by using electronic mail, a method of controlling the same, and a storage medium.

2. Description of the Related Art

There is available a printing system which allows a printing apparatus (printer) connected on a network to directly execute printing from a mobile terminal such as a cellular phone without the intervention of a PC (Personal Computer) or the like. In such a printing system, in general, a mobile terminal transmits a print target file to a printer upon attaching the file to print target electronic mail to cause the printer to execute printing based on the file. In this case, the mobile terminal transmits electronic mail attached with a print target file to an electronic mail address, as a destination, which corresponds to a printer to execute printing. The printer receives the electronic mail from a mail server and executes printing based on the received electronic mail and the file attached to the electronic mail.

Japanese Patent Laid-Open No. 2004-220606 discloses a system in which a cellular phone transmits electronic mail and its attached file to a specific server on a network, and the server generates print data from the data received from the cellular phone and causes a designated printer to print the data. This system designates a printer based on the electronic mail address assigned to the printer. In addition, in the system disclosed in Japanese Patent Laid-Open No. 2004-220606, when the mail server notifies a mobile terminal that electronic mail addressed to the mobile terminal is stored, the mobile terminal can instruct a specific printer to print the electronic mail and its attached file. This allows the mobile terminal to make the printer print long electronic mail whose browsing may be limited due to too large a display screen size or the like or an attached file whose browsing may be limited due to inability to execute an application program.

In addition, Japanese Patent Laid-Open No. 2001-312392 discloses a printing system in which a mobile terminal such as a cellular phone or PDA makes a printer print electronic mail and its attached file via an application server. In this printing system, a printer is connected to a network via a dedicated adapter directly connected to the printer. This printer functions as an interface between the application server and the printer and transmits the print data received from the application server to the printer, thereby causing the printer to print the print data.

In a printing system like that disclosed in Japanese Patent Laid-Open Nos. 2004-220606 and 2001-312392, in general, a printer driver (print driver) for operating a printer is installed in a server in advance. In addition, an application program for generating print data (print job) from the electronic mail and its attached file received from a mobile terminal or the like is also installed in the server in advance. If the server is formed from, for example, a PC, it is possible to display a screen associated with the operation or state of the printer on the display unit of the PC via the printer driver and the application program. In this case, the user can issue, on the PC, an instruction to resolve errors by cancelling print job, avoiding (skipping) error, and the like based on display on a display unit.

The above technique, however, has the following problem. For example, in the above printing system using electronic mail, a printer driver and application programs are installed in a server and operate on the server. On the other hand, no such printer driver or application programs are installed in a mobile terminal. For this reason, although the user of the mobile terminal can check screen display associated with the operation or state of a printer capable of executing printing based on electronic mail on the server, he/she cannot check it on the mobile terminal.

Even if, therefore, an error occurs in the printer, the user of the mobile terminal cannot properly handle the error that has occurred. In addition, even if the user of the mobile terminal is notified of the occurrence of an error from a server, he/she cannot handle the error on the mobile terminal by using a printer driver or application program. In such a case, even when an error has occurred in the printer, it is desirable to allow the printer to continue printing as long as it can.

SUMMARY OF THE INVENTION

The present invention has been made in consideration of the above problem. The present invention provides a technique of making a printer continue printing as long as it can even upon the occurrence of an error when making the printer execute printing based on the electronic mail received by an information processing apparatus (server) from a mobile terminal.

According to one aspect of the present invention, there is provided an information processing apparatus which is configured to communicate with a printing apparatus via a network, the apparatus comprising: a reception unit configured to receive, from a mobile terminal, electronic mail to which a print target file is attached and in which a printing apparatus to print the file is designated; a print control unit configured to cause a printing apparatus designated in the electric mail to execute printing based on the print target file attached to the electric mail; a detection unit configured to detect an error which occurs during execution of printing by the designated printing apparatus; and an instruction unit configured to instruct, if the electronic mail received by the reception unit includes information instructing to skip an error which occurs in the designated printing apparatus, the designated printing apparatus to continue printing by skipping the error detected by the detection unit in accordance with a type of the error.

According to another aspect of the present invention, there is provided a method of controlling an information processing apparatus which is configured to communicate with a printing apparatus via a network, the method comprising: receiving, from a mobile terminal, electronic mail to which a print target file is attached and in which a printing apparatus to print the file is designated; causing a printing apparatus designated in the electric mail to execute printing based on the print target file attached to the electric mail; detecting an error which occurs during execution of printing by the designated printing apparatus; and instructing, if the received electronic mail includes information instructing to skip an error which occurs in the designated printing apparatus, the designated printing apparatus the designated printing apparatus to continue printing by skipping the detected error in accordance with a type of the detected error.

The present invention can provide a technique of making a printer continue printing as long as it can even upon the occurrence of an error when making the printer execute printing based on the electronic mail received by an information processing apparatus (server) from a mobile terminal.

Further features of the present invention will become apparent from the following description of exemplary embodiments (with reference to the attached drawings).

BRIEF DESCRIPTION OF THE DRAWINGS

FIG. 8 is a view showing an example of a table associating extensions with applications according to the embodiment of the present invention;

FIG. 9 is a view showing an example of a table associating printer drivers, printer names, and avoidance mode values with each other according to the embodiment of the present invention;

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Arrangement of Printing System 100>

Figure 1:
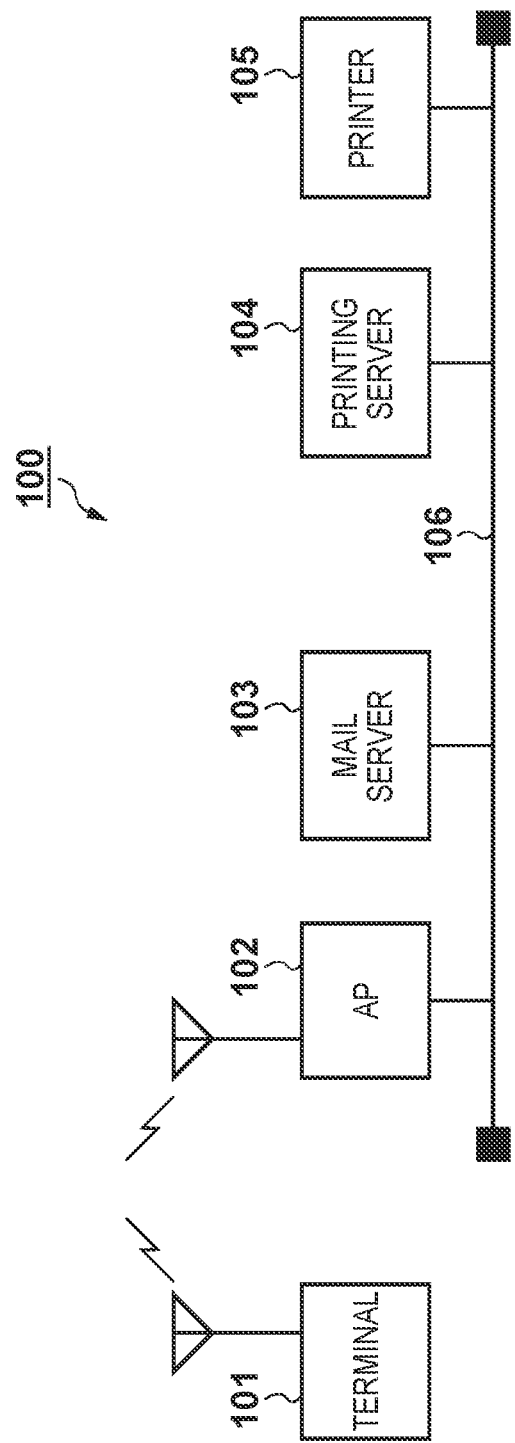
FIG. 1 is a view schematically showing an example of the arrangement of a printing system 100 according to an embodiment of the present invention.

FIG. 1 is a view schematically showing an example of the arrangement of a printing system 100 according to an embodiment of the present invention. As shown in FIG. 1, the printing system 100 includes a mobile terminal 101, an AP (Access Point) 102, a mail server 103, a printing server 104, and a printer 105. The AP 102, the mail server 103, the printing server 104, and the printer 105 are mutually connected to each other via a wired LAN (Local Areal Network) 106 so as to be communicable with each other. The wired LAN 106 is formed from Ethernet®. In this embodiment, the printer 105 is an example of a printing apparatus, and the printing server 104 is an example of an information processing apparatus which can communicate with the printing apparatus via a network. Although FIG. 1 shows only one printer (printer 105), a plurality of printers may be connected to the wired LAN 106.

The mobile terminal 101 is an information terminal such as a cellular phone or smart phone having a size that allows to carry it with a hand, and can make various kinds of application programs run on the installed OS (Operating System). For example, an application program (that is, electronic mail software) for transmitting/receiving electronic mail via wireless communication is installed in the mobile terminal 101. The user of the mobile terminal 101 can instruct the printer to print electronic mail and its attached file by using this electronic mail software via a network.

The AP 102 is a device functioning as a bridge for connecting the mobile terminal 101 to a wired network via wireless communication. The AP 102 may be an access point complying with a wireless LAN scheme such as IEEE802.11a/b/g. In this case, the mobile terminal 101 can access the wired LAN 106 via the AP 102 and can also access the devices connected to the wired LAN 106.

The mail server 103 functions as an SMTP server and a POP server. The mail server 103 transmits and receives electronic mail (E-mail) to and from external apparatuses (for example, the mobile terminal 101) in accordance with SMTP and POP. The mail server 103 is formed as a general information processing apparatus such as a PC, in which a program for implementing a function as a mail server (SMTP server or POP sever) is installed and runs. In this embodiment, for example, the mail server 103 receives and holds the electronic mail transmitted from the mobile terminal 101 and addressed to an electronic mail address corresponding to the mail server 103.

A printer driver (print driver) corresponding to the printer 105 connected to the wired LAN 106 is installed in the printing server 104, and controls the operation of the printer 105 via the printer driver. If printers other than the printer 105 are connected to the wired LAN 106, printer drivers corresponding to these printers are also installed in the printing server 104.

As will be described later, the printing server 104 analyzes the electronic mail and its attached file received from the mobile terminal 101 via the mail server 103 to generate print data which can be printed by the printer designated in the electronic mail. An application program (printing application) for performing such analysis is installed in the printing server 104. The printing server 104 also transmits the generated print data to the designated printer and instructs (commands) the printer to execute printing based on the print data by using the printer driver. The printing server 104 is also formed as a general information processing apparatus such as a PC like the mail server 103, in which a program for implementing a function as a printing server is installed and runs.

The printing server 104 controls the printer 105 based on a printer driver and an application program which operate in the printing server 104. The printer 105 prints an image based on the print data received from the printing server 104 on a sheet in accordance with a print instruction from the printing server 104.

<Arrangement of AP 102>

Figure 2:
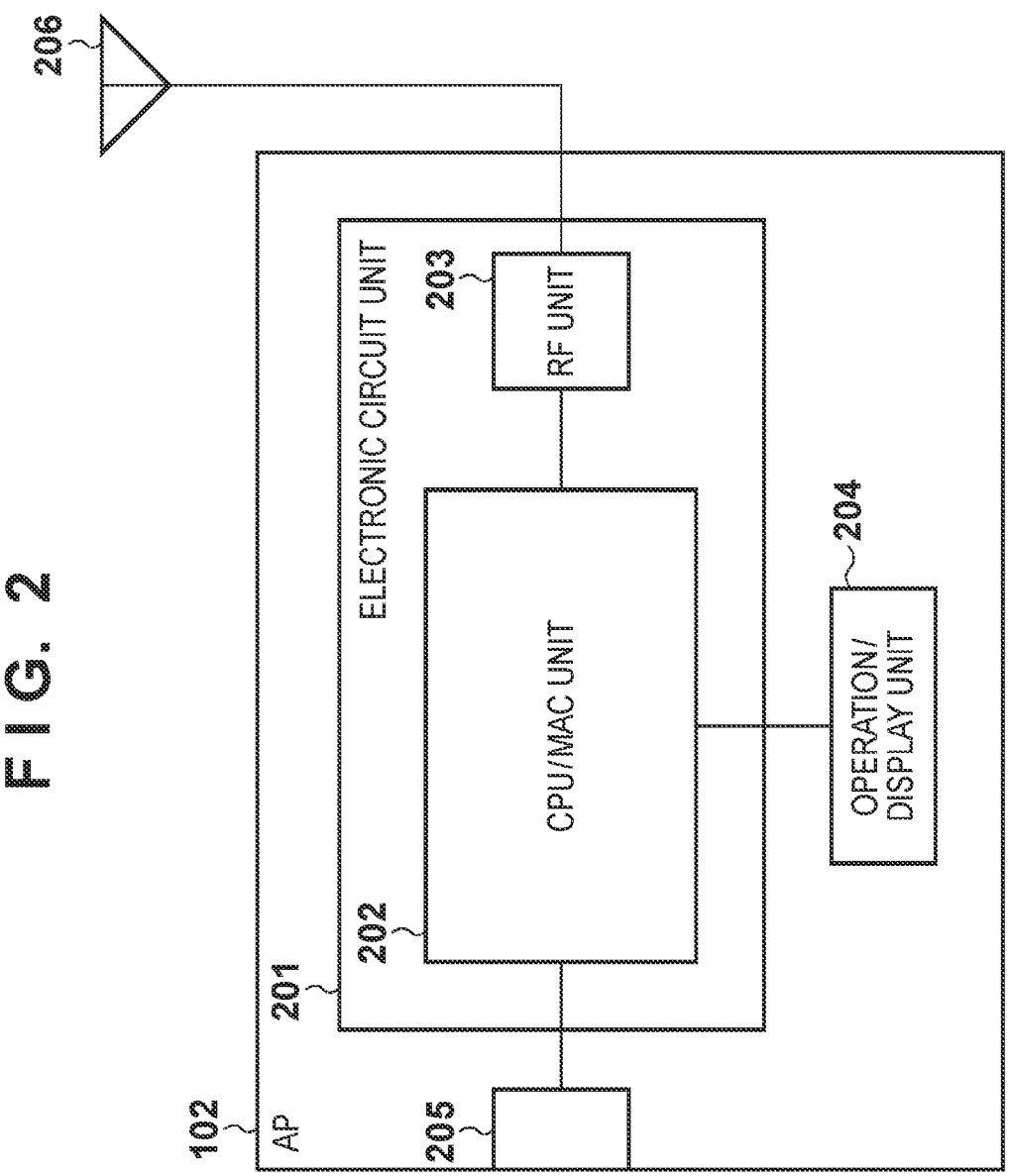
FIG. 2 is a block diagram schematically showing an example of the arrangement of an AP 102 in the printing system 100 according to the embodiment of the present invention.

FIG. 2 is a block diagram schematically showing an example of the arrangement of the AP 102. The AP 102 is a device functioning as a bridge which enables mutual communication between an apparatus (for example, the mobile terminal 101) connected to a wireless communication network and an apparatus connected to a wired network (for example, the wired LAN 106). The AP 102 includes an electronic circuit unit 201, an operation/display unit 204, a wired LAN port 205, and an antenna 206. The wired LAN port 205 includes a connector to which an Ethernet cable for connection to the wired LAN 106 can be connected. The operation/display unit 204 includes, for example, an LED and a switch, and displays the states of the main body of the AP 102, each port, and the like. Note that one end of the Ethernet cable is connected to the wired LAN port 205, and the other end is connected to a network hub (not shown). The mail server 103, the printing server 104, and the printer 105 can be connected to the network hub.

The electronic circuit unit 201 includes a CPU/MAC unit 202 and a radio frequency transceiver unit (to be referred to as an RF (Radio Frequency) unit hereinafter) 203. The CPU/MAC unit 202 incorporates a CPU, a memory, and a MAC (Media Access Control) unit. These devices are connected to each other via a bus in the CPU/MAC unit 202. The MAC unit in the CPU/MAC unit 202 can execute wireless communication via the RF unit 203 and wired communication via the wired LAN port 205, and bridges these communications.

The antenna 206 for transmitting and receiving radio waves having a frequency corresponding to the wireless LAN scheme in use is connected to the RF unit 203. The RF unit 203 converts a radio signal (analog signal) included in the radio waves received by the antenna 206 into a digital signal and outputs it to the CPU/MAC unit 202. The CPU/MAC unit 202 analyzes a destination or path from the digital signal received from the RF unit 203, and transmits the signal onto the wired LAN 106 via the wired LAN port 205. The RF unit 203 converts the digital signal received from the CPU/MAC unit 202 into an analog signal (radio signal) to be transmitted to the antenna 206, and outputs the signal. Note that the AP 102 includes a security function for safe wireless LAN connection.

<Arrangements of Mail Server 103 and Printing Server 104>

Figure 3:
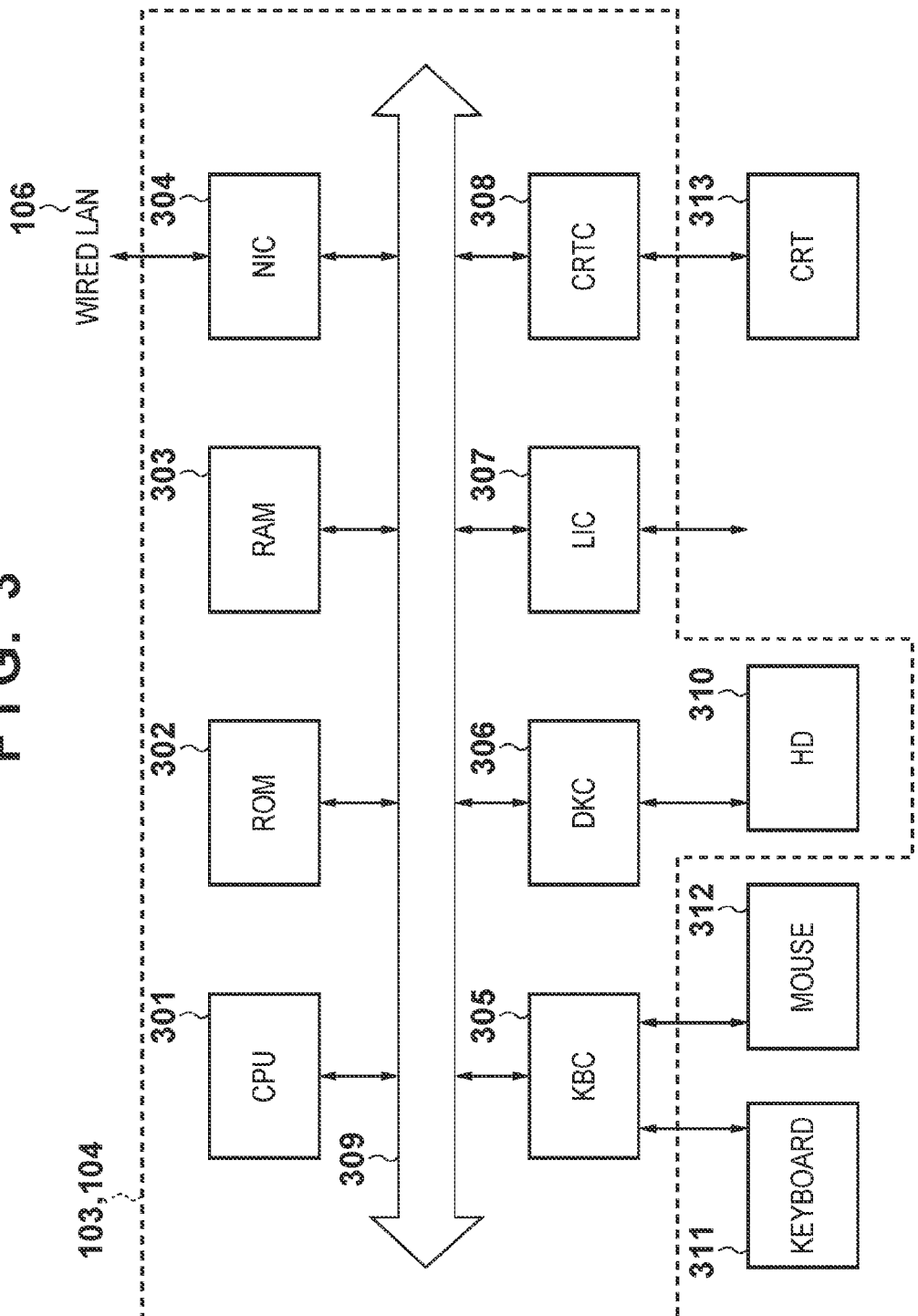
FIG. 3 is a block diagram showing an example of the hardware arrangement of a mail server 103 in the printing system 100 according to the embodiment of the present invention.

FIG. 3 is a block diagram showing an example of the hardware arrangement of the mail server 103. As described above, the mail server 103 is formed as a PC, in which a program for implementing a server function is installed and runs. Note that the printing server 104 also has the same hardware arrangement as that of the mail server 103.

The mail server 103 includes a CPU 301, a ROM 302, a RAM 303, and an NIC (Network Interface Controller) 304. The mail server 103 further includes a KBC (KeyBoard Controller) 305, a DKC (DisK Controller) 306, an LIC (Local Interface Controller) 307, and a CRTC (CRT Controller) 308. These devices are connected to each other via a bus 309 in the mail server 103.

The NIC 304 is connected to the wired LAN 106, and functions as an interface for communication with an external apparatus. A keyboard 311 and a mouse 312 are connected to the KBC 305. An HD (Hard Disk) 310 is connected to the DKC 306. A peripheral device can be connected to the LIC 307 via a local interface such as a USB. A CRT display 313 is connected to the CRTC 308. Note that peripheral devices such as a printer may be connected via the NIC 304 as well as the LIC 307.

The ROM 302 stores programs such as a basic I/O program and an OS. The CPU 301 reads out programs stored in the ROM 302 to the RAM 303 and executes it to implement the function of the OS on the mail server 103. The HD 310 stores application programs running on the OS. The CPU 301 reads out the application programs stored in the HD 310 to the RAM 303 and executes it to implement the functions of the respective application programs on the OS.

In the mail server 103, programs for implementing the functions of the SMTP server and POP server are installed in the HD 310. In the printing server 104, a program (printer driver) for performing print control on the printer 105 and programs such as an application program for analyzing received electronic mail and its attached file are installed in the HD 310. The mail server 103 and the printing server 104 respectively implement server functions by executing these programs installed in the HD 310.

<Arrangement of Printer 105>

Figure 4:
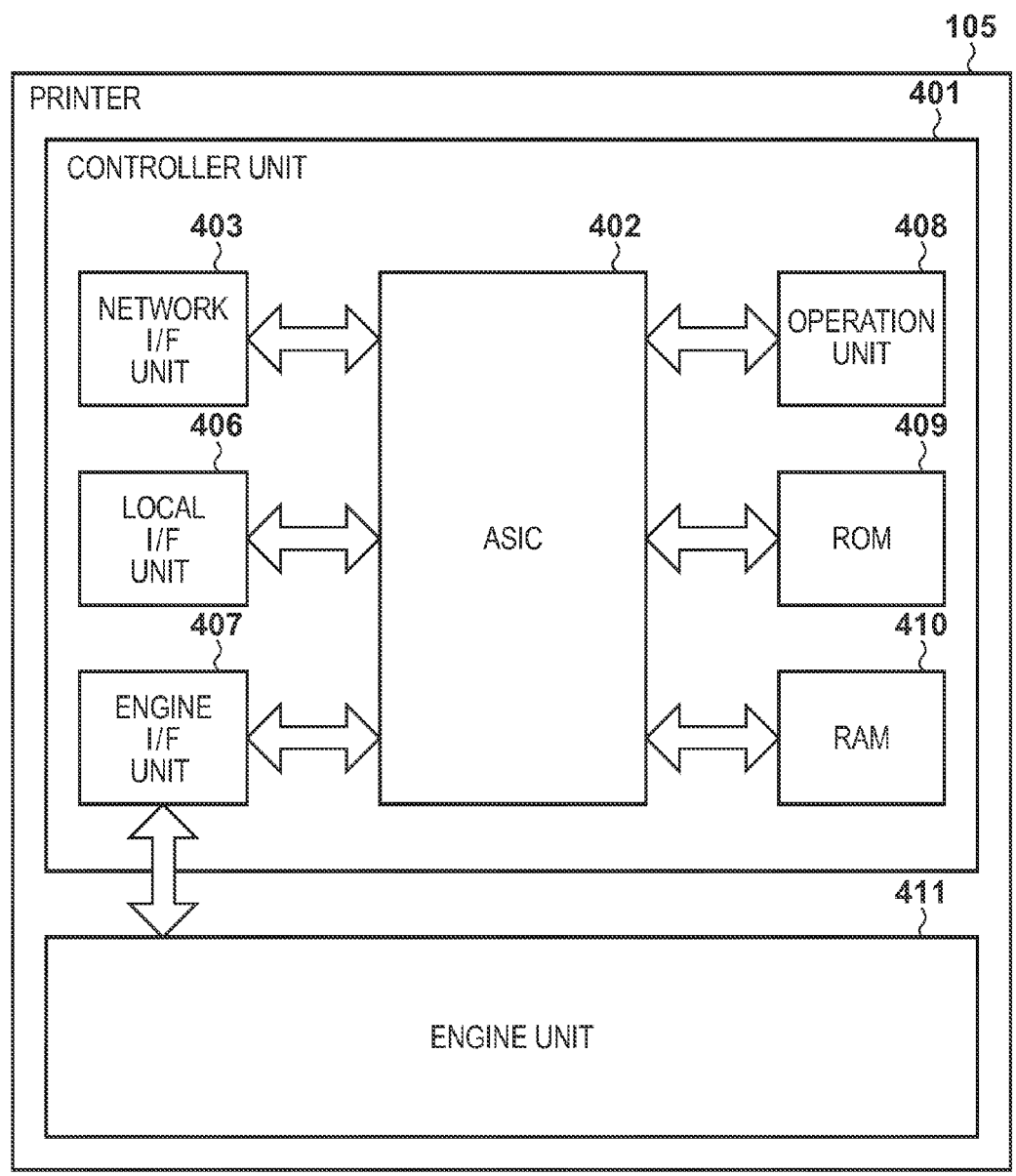
FIG. 4 is a block diagram schematically showing an example of the arrangement of a printer 105 in the printing system 100 according to the embodiment of the present invention.

FIG. 4 is a block diagram schematically showing an example of the arrangement of the printer 105. The printer 105 roughly includes a controller unit 401 and an engine unit 411. The controller unit 401 includes an ASIC 402, a network I/F (interface) unit 403, a local I/F unit, an engine I/F unit 407, an operation unit 408, a ROM 409, and a RAM 410. The controller unit 401 processes received print data via the network I/F (interface) unit 403 or a local I/F unit 406.

The ASIC 402 incorporates a CPU and mainly sends print data to the engine unit 411 to make the engine unit 411 execute printing based on the print data. The operation unit 408 simply notifies the user of the operation state of the printer by blinking the LED. Note that the operation unit 408 cannot display the detailed operation state of the printer 105, and does not include any input interface for allowing the user to issue a detailed operation instruction to the printer 105. The ROM 409 stores a program necessary for the operation of the printer 105. The RAM 410 is used as an image rendering area when the ASIC 402 (CPU) processes print data or a work area for a program.

The network I/F unit 403 functions as an interface for transmitting and receiving data to and from the printing server 104 and external apparatuses such as another PC via a network. The local I/F unit 406 functions as an interface for transmitting and receiving data to and from the PC connected via a local interface such as a USB. The engine I/F unit 407 functions as an interface for transmitting the print data processed by the ASIC 402 to the engine unit 411. The engine unit 411 prints an image based on the print data received from the controller unit 401 on a sheet.

<Electronic Mail Transmitting/Receiving Operation in Printing System 100>

Figure 5:
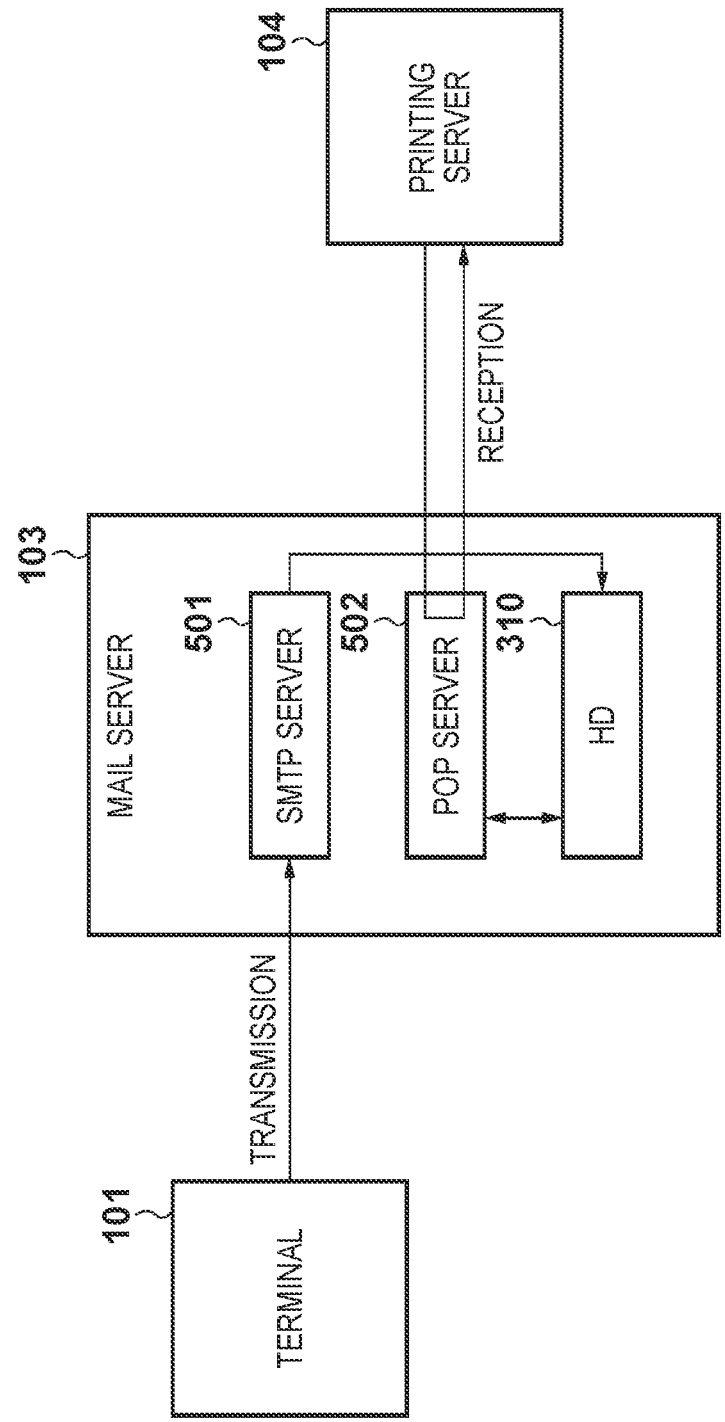
FIG. 5 is a view schematically showing a transmitting/receiving operation procedure for electronic mail in the printing system 100 according to the embodiment of the present invention.

FIG. 5 is a view schematically showing a procedure for electronic mail transmitting/receiving operation in the printing system 100. The mobile terminal 101 uses electronic mail software to transmit electronic mail for making the printer 105 execute printing to an electronic mail address (electronic mail address corresponding to the mail server 103), as a destination, at which the printing server 104 can receive the mail. The electronic mail software in the mobile terminal 101 designates a predetermined electronic mail address corresponding to the printer 105, for example, USER@mailprint.xx.jp as a destination address. Assume that in this embodiment, the mail server 103 receives electronic mail corresponding to the domain included in this electronic mail address. The printing server 104 can receive the electronic mail received by the mail server 103 from the mail server 103 in accordance with POP. The mail server 103 receives the above electronic mail transmitted from the mobile terminal 101 via the AP 102 and the wired LAN 106. An SMTP server 501 operating on the mail server 103 receives electronic mail from the mobile terminal 101 in accordance with SMTP and stores the mail in the HD 310.

The printing server 104 receives electronic mail stored in the mail server 103 in accordance with POP. A print application running on the printing server 104 checks the presence/absence of electronic mail received by the mail server 103 with respect to a POP server 502 operating on the mail server 103. The print application checks, with respect to the POP server 502, whether electronic mail addressed to an electronic mail address corresponding to the mail server 103 (printing server 104) has been received. The print application executes such check processing at predetermined intervals.

The POP server 502 requests for a user name and a password in response to access from the printing server 104. Upon succeeding in authentication based on the user name and the password notified from the printing server 104, the POP server 502 checks the electronic mail stored in the HD 310 and transmits information indicating the presence/absence of electronic mail corresponding to the printing server 104 to the printing server 104. Upon receiving electronic mail corresponding to the printing server 104 and storing it in the HD 310, the POP server 502 transmits the electronic mail to the printing server 104.

<Printing Operation Based on Electronic Mail in Printing System 100>

Figure 6:
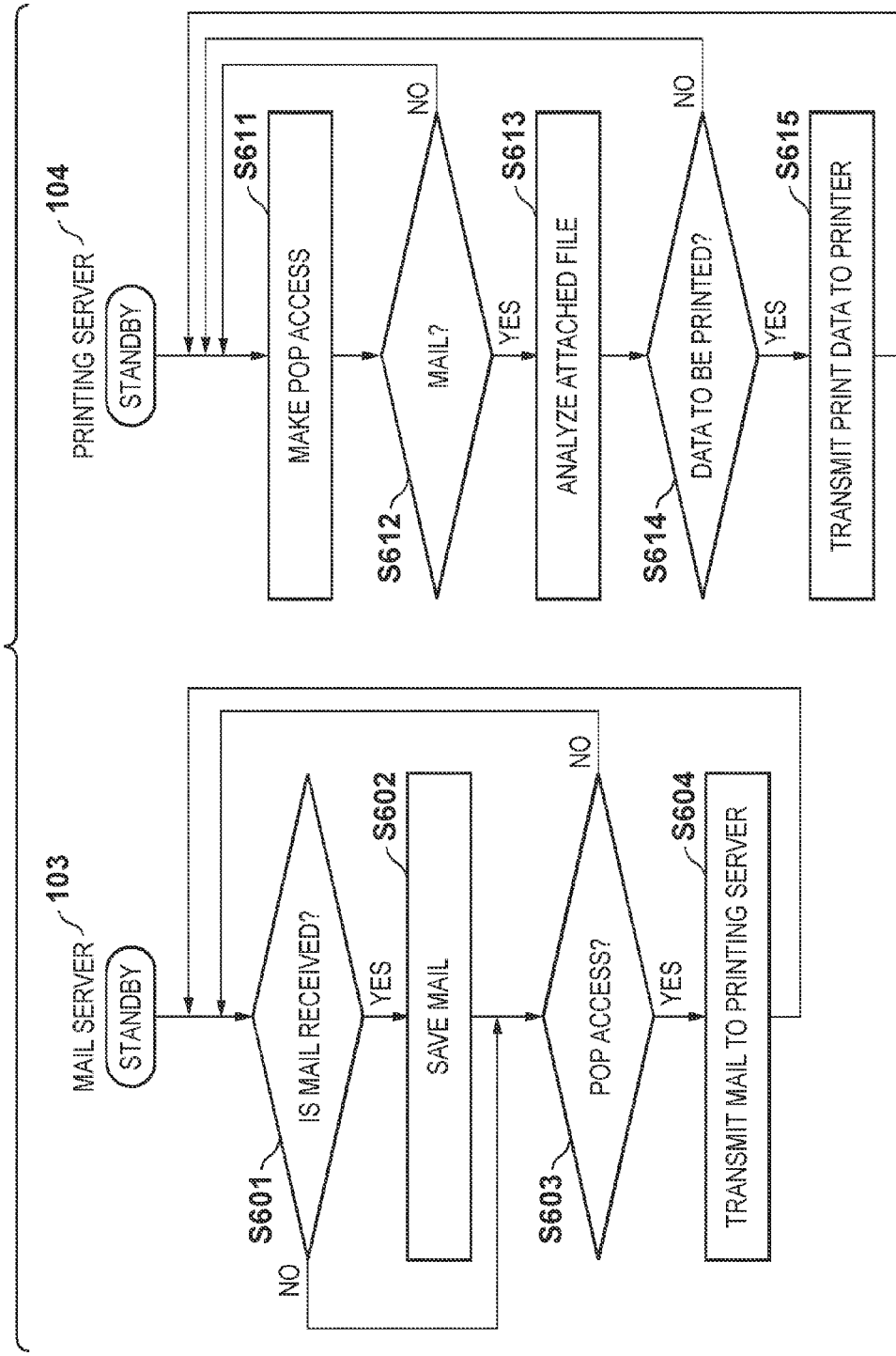
FIG. 6 is a flowchart showing the operation procedures of the mail server 103 and a printing server 104 according to the embodiment of the present invention.

FIG. 6 is a flowchart showing the operation procedures of the mail server 103 and the printing server 104 in the printing system 100. Printing operation based on electronic mail in the printing system 100 will be described with reference to FIG. 6.

Figure 13:
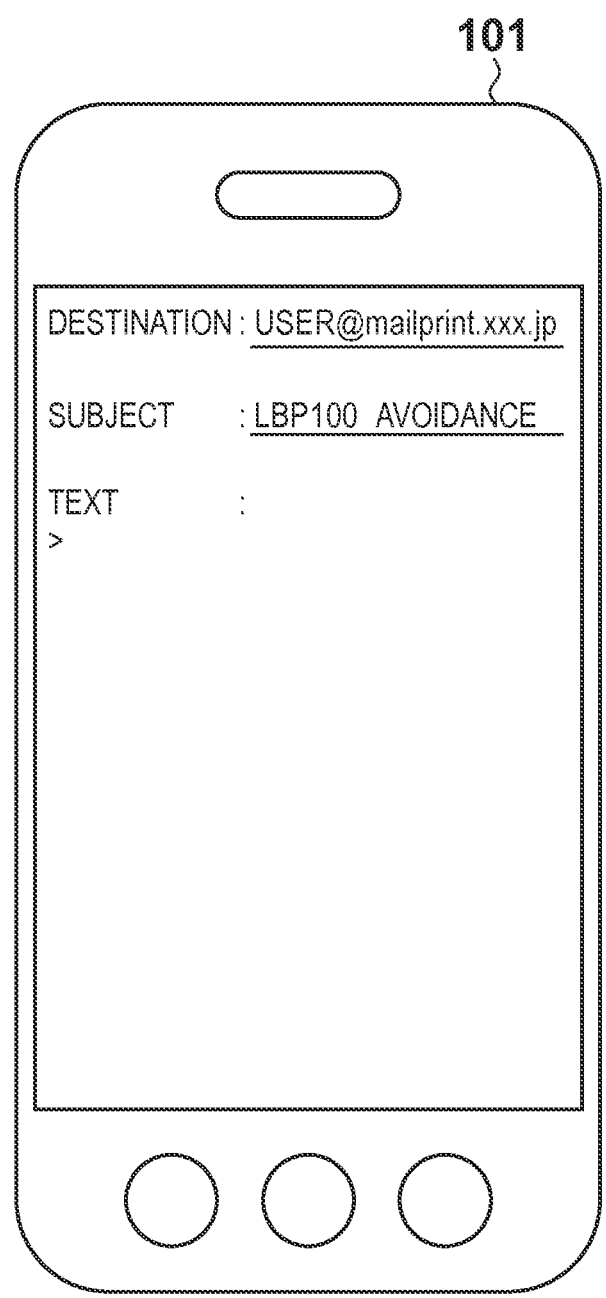
FIG. 13 is a view showing an example of the transmission screen of electronic mail on the mobile terminal 101 according to the embodiment of the present invention.

In the printing system 100, the electronic mail software in the mobile terminal 101 transmits electronic mail in which a printer to execute printing is designated, upon attaching a print target file to the mail. The mobile terminal 101 displays the transmission screen of the electronic mail software. The user then attaches a print target file and designates a printer to execute printing via the transmission screen, as shown in FIG. 13. On the transmission screen, for example, as shown in FIG. 13, the user inputs USER@mailprint.xx.jp to an address field and

LBP100 to a subject field. This electronic mail address is an address corresponding to the mail server 103 (printing server 104). As described above, the user inputs the name of a printer to execute printing to the address field of the electronic mail attached with the print target file. Note that the user may input the name of the printer to the text of the electronic mail instead of the subject field. In this manner, the user writes information indicating a printer to execute printing a print target file on the subject field or text of electronic mail. The name of a printer is an example of an identifier for specifying the printer. It is therefore possible to use information other than the name of a printer such as an IP address as long as it can specify the printer. In this case, the table shown in FIG. 9 (to be described later) manages information such as IP addresses in association with printer drivers.

In this case, when it is designated to execute printing in an "avoidance mode" (to be described later), the user can write information indicating the designation in the subject field or text of electronic mail. For example, it is possible to input LBP100 avoidance in the subject field or text of electronic mail. This input "avoidance" is an example of information indicating that printing should be executed in the "avoidance mode" (that is, any error that occurs in the printer should be automatically resolved).

The AP 102 receives the above electronic mail transmitted from the mobile terminal 101 by wireless communication. The AP 102 transmits the received electronic mail to the mail server 103 designated as the designation of the mail via the wired LAN 106. Upon receiving the electronic mail in accordance with SMTP (step S601), the mail server 103 stores the received electronic mail in the HD 310 together with the attached file (step S602).

The printing server 104 makes an inquiry about the presence/absence of electronic mail by performing POP access to the mail server 103 at predetermined intervals (for example, constant intervals) as described above (step S611). In response to the POP access from the printing server 104 (step S603), the mail server 103 transmits, if electronic mail is stored in the HD 310, the electronic mail and its attached file to the printing server 104 (step S604). Upon receiving the electronic mail from the mail server 103 (step S612), the printing server 104 analyzes the file attached to the electronic mail (step S613).

If the analysis result in step S613 indicates that the file attached to the received electronic mail is print target data (step S614), the printing server 104 generates print data from the attached file. In addition, the printing server 104 transmits the generated print data to the printer designated in the received electronic mail (the printer 105 in this case) (step S615). Note that in this embodiment, a file before analysis by the printing server 104 in step S613 will be referred to as an "attached file", and the data rendered from the attached file so as to be printable by a printer to execute printing will be referred to as "print data".

Finally, the printer 105 forms an image based on the print data on a sheet by printing the print data received from the printing server 104.

<Print Control on Printing Server 104>

Figure 7:
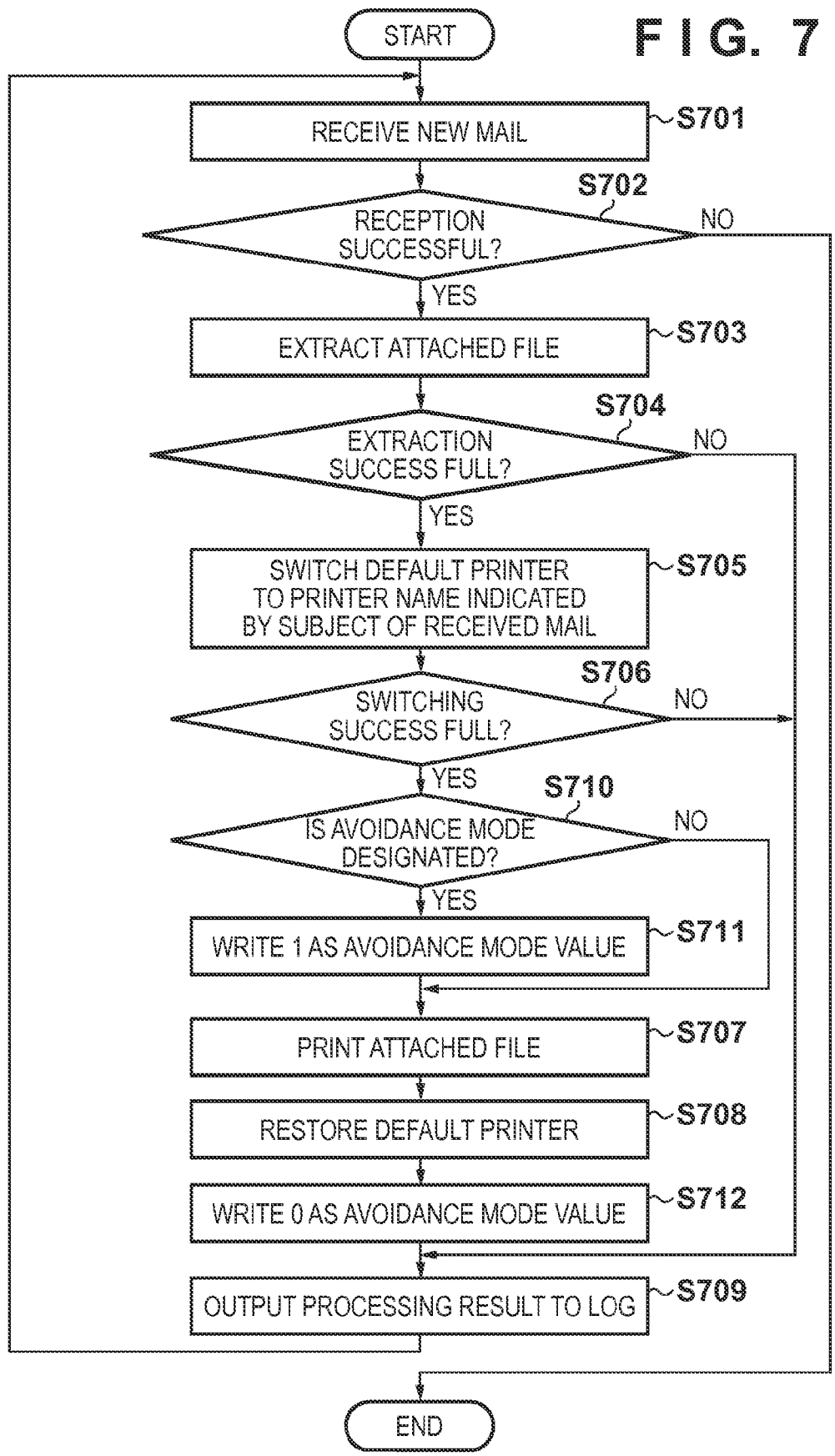
FIG. 7 is a flowchart showing a procedure for print control on the printer 105 which is executed by the printing server 104 according to the embodiment of the present invention.

FIG. 7 is a flowchart showing a procedure for print control on the printer 105 which is executed by the printing server 104. FIG. 7 is a flowchart for explaining the details of operation associated with the "avoidance mode" (to be described later) executed in steps S611 to S615 described with reference to FIG. 6. The CPU 301 of the printing server 104 executes the processing in each step shown in FIG. 7.

First of all, in step S701, the CPU 301 receives electronic mail from the mail server 103. This electronic mail is transmitted from the mobile terminal 101, to which a print target file is attached and in which the printer 105 is designated as a printer to execute printing for the attached file. In step S702, the CPU 301 determines whether electronic mail from the mail server 103 has been successfully received. If YES, the process advances to step S703. If NO, the CPU 301 terminates the processing.

In step S703, the CPU 301 extracts the file attached to the received electronic mail. In step S704, the CPU 301 further determines whether the extraction in step S703 has succeeded. If YES, the CPU 301 stores the extracted file in the HD 310. If NO, the process advances to step S709 to output the processing result to the log. Note that the CPU 301 displays this log on the CRT display 313 and stores it in the HD 310. This allows the user to use the log for troubleshooting.

In step S705, the CPU 301 switches the default printer setting to "printer name" written in the subject field (or text) of the received electronic mail. Assume that in this embodiment, the name of the printer 105 is written as the printer name, and the printer 105 is designated as a printer to print the attached file. In step S706, the CPU 301 further determines whether the switching operation has succeeded. If YES, the process advances to step S707. If NO, the process advances to step S709. In step S709, the CPU 301 outputs the processing result to the log as in the above case.

When the process advances to step S710, the CPU 301 determines whether the "avoidance mode" is designated in the subject field or text of received electronic mail. In this case, the "avoidance mode" is an operation mode of automatically resolving any error that occurs in a designated printer (printer 105) when the printer notifies the occurrence of an error during the execution of printing based on print data. Upon determining in step S710 that the avoidance mode is designated, the CPU 301 writes, in step S711, "1" as an avoidance mode value in a storage area, of the HD 310, which corresponds to the printer (printer 105) designated in the received electronic mail. The CPU 301 manages such avoidance mode values in the table 900 as shown in FIG. 9 and holds these values in the HD 310. In contrast to this, if the CPU 301 determines in step S710 that the avoidance mode is not designated, the process advances to step S707.

In step S707, the CPU 301 causes the printer 105 designated in the electronic mail to print the attached file extracted from the received electronic mail. In this case, the CPU 301 checks the extension of the attached file and activates an application, stored in the HD 310, which corresponds to the file. The CPU 301 activates an application corresponding to the extension of the attached file by referring to a table 800 shown in FIG. 8, which associates the extensions of the files attached to electronic mails with applications for processing the files. The CPU 301 causes the printer 105 to print the attached file by using the printing function of the activated application.

In addition, the CPU 301 activates the printer driver linked to the name of the printer designated as a printer to execute printing, which is obtained in step S705. The CPU 301 generates print data by analyzing the attached file extracted from the received electronic mail and rendering the file into print data printable by the printer 105 using the activated printer driver. Thereafter, the CPU 301 performs the print control of transmitting the generated print data to the designated printer 105 to cause the printer 105 to execute printing based on the print data.

The printing server 104 holds print settings in the HD 310 in advance for each printer including the printer 105 as a control target via a network (the wired LAN 106). In step S707, when performing print control on the printer 105, the CPU 301 causes the printer (the printer 105 in this case) designated in the electronic mail to execute printing in accordance with print settings, of the print settings held in the HD 310, which correspond to the printer.

In step S707, the CPU 301 can decide a printer driver to be activated by using a table 900 shown in, for example, FIG. 9 as a table associating printer drivers with printer names. Every time a new printer is connected to the wired LAN 106 or the local I/F unit 406 of the printing server 104, the CPU 301 adds information indicating a printer driver for the printer and the printer name to the table 900.

If the designated printer 105 notifies in step S707 that an error has occurred during the execution of printing based on print data, the CPU 301 executes processing in accordance with the avoidance mode value stored in the corresponding storage area of the HD 310 in the manner described later.

Upon completion of printing of the attached file, the CPU 301 restores the default printer settings in step S708, and writes "0" as an avoidance mode value in the storage area, of the HD 310, which corresponds to the designated printer 105 in step S712. Subsequently, the CPU 301 outputs the processing result to the log in step S709. The process then returns to step S701.

<Example of Display Screen on Printing Server 104>

Figure 10:
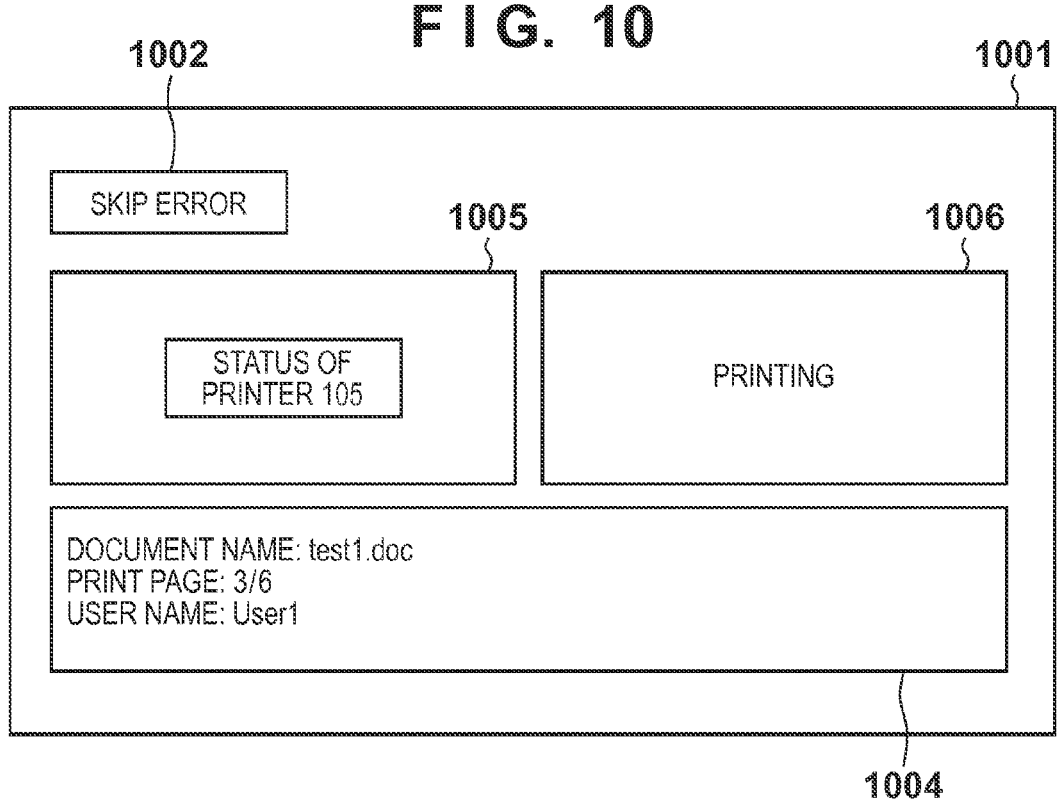
FIG. 10 is a view showing an example of the screen displayed by a UI application according to the embodiment of the present invention.

FIG. 10 shows an example of a screen (screen 1001) showing the operation or state of a printer (the printer 105 in this case) designated in received electronic mail, which is notified from the printer 105. This screen is used to perform operation associated with the printer 105. The UI application installed in the printing server 104 displays such a screen on the CRT display 313. The UI application, when installed together with a printer driver in the printing server 104 by the user, is associated with the corresponding printer 105. This UI application is executed by the CPU 301 as with the printer driver.

The screen 1001 displayed by a UI application includes an error skip button 1002, a job execution status display portion 1004, a device state display portion 1005, and a device state explanation portion 1006, as shown in FIG. 10.

Figure 11:
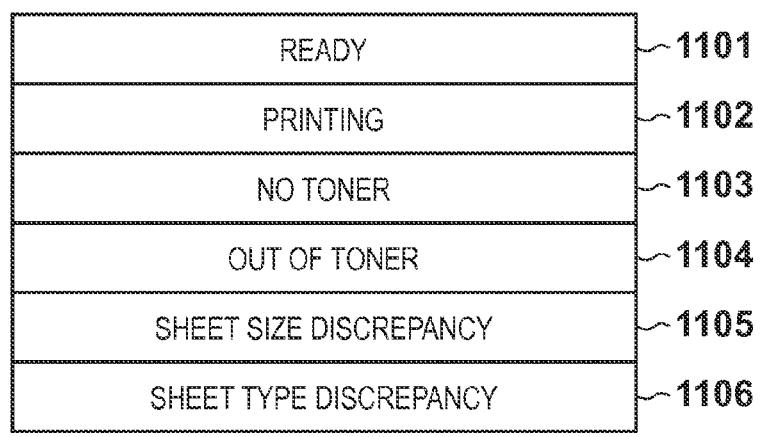
FIG. 11 is a view showing an example of statuses that the printer 105 according to the embodiment of the present invention can take.

The device state display portion 1005 displays information indicating the status of the printer 105 designated in received electronic mail, which is notified from the printer 105. FIG. 11 shows an example of the statuses which the printer 105 can take. The respective statuses indicate the following states:

"ready" 1101: a state in which the printer 105 can perform printing;

"printing" 1102: a state in which the printer 105 is performing printing;

"no toner" 1103: a state in which no toner cartridge is set in the printer 105;

"out of toner" 1104: a state in which the amount of toner for printing included in a toner cartridge is too small to guarantee print quality;

"sheet size discrepancy" 1105: a state in which the size of a sheet held in the feeding unit of the printer 105 differs from the sheet size designated by print settings from the printing server 104; and "sheet type discrepancy" 1106: a state in which the type of sheet held in the feeding unit of the printer 105 differs from the sheet type designated by the printing settings from the printing server 104.

Of these statuses, the statuses 1101 to 1104 are those which indicate that errors have occurred in the printer 105. "No toner" 1103 corresponds to a status in which it is not possible to continue printing by skipping, that is, an error which cannot be automatically resolved in the printer 105. On the other hand, "out of toner" 1104, "sheet size discrepancy" 1105, and "sheet type discrepancy" 1106 correspond to statuses in which it is possible to continue printing by skipping, that is, errors which can be automatically resolved in the printer 105.

Referring back to FIG. 10, the device state explanation portion 1006 displays a text describing a detailed description about the statuses (FIG. 11) of the printer 105. The job execution status display portion 1004 indicates the execution state by the printer 105 of a print job based on the print data and print settings received from the printing server 104. Referring to FIG. 10, the job execution status display portion 1004 indicates, for example, that printing of a document named "test1.doc" of user "User1" is complete up to the third page of six pages. Note that while the printer 105 is not performing printing, the job execution status display portion 1004 displays nothing.

The error skip button 1002 is a button for issuing an instruction to skip (resolve) an error which has occurred in the printer 105 and continue printing operation. The error skip button 1002 is activated only in a status in which it is possible for the printer 105 to continue printing by skipping an error. The user can operate the error skip button 1002 by using the mouse 312. If, however, "1" is set as an avoidance mode value for the printer 105 in step S711, the printing server 104 executes control to automatically avoid (resolve) an error without operation of the user.

<Operation Corresponding to Avoidance Mode Value in Printing Server 104>

Figure 12:
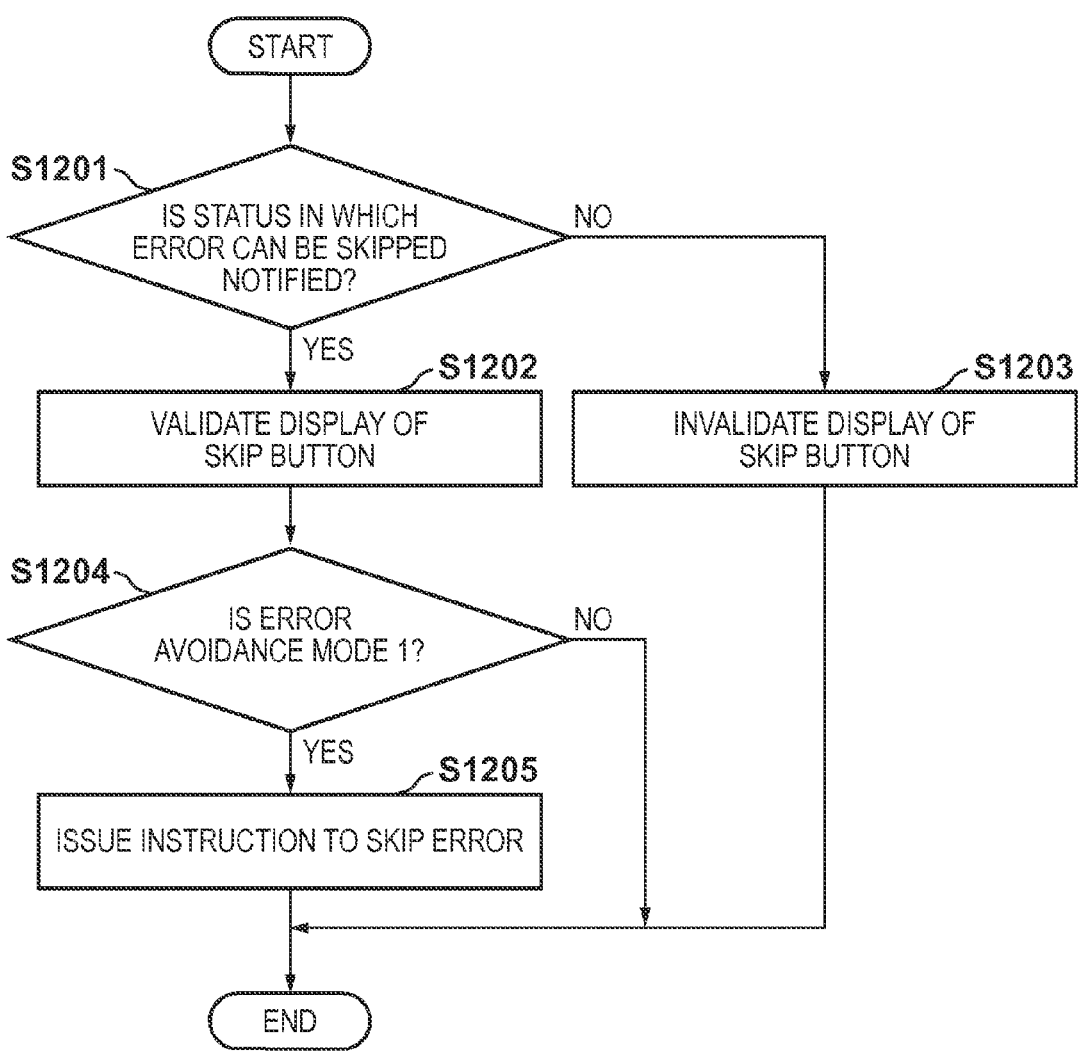
FIG. 12 is a flowchart showing the operation procedure executed by the printing server 104 according to the embodiment of the present invention in accordance with the status notified from the printer 105 and an avoidance mode value.

FIG. 12 is a flowchart showing an operation procedure executed by the printing server 104 in accordance with the status notified from the printer 105 and an avoidance mode value. The CPU 301 of the printing server 104 executes the processing in each step shown in FIG. 12.

In step S1201, the CPU 301 determines, upon being notified of a status from the printer 105, whether the status is a status in which an error can be skipped (that is, a state in which an error that can be automatically resolved has occurred). As described above, in this embodiment, if the status is "out of toner" 1104, "sheet size discrepancy" 1105, or "sheet type discrepancy" 1106, the CPU 301 determines that an error can be skipped, and the process advances to step S1202. If the status is "no toner" 1103, the CPU 301 determines that an error cannot be skipped, and the process then advances to step S1203.

In step S1203, the CPU 301 inactivates the error skip button 1002 and terminates the processing. In step S1202, the CPU 301 activates the error skip button 1002, and the process advances to step S1204. In step S1204, the CPU 301 refers to the table 900 to determine whether the avoidance mode value corresponding to the printer 105 is "1". If the avoidance mode value is "1", the CPU 301 determines that the avoidance mode is valid, and the process then advances to step S1205. In step S1205, the CPU 301 issues an instruction to automatically skip (resolve) an error to the printer 105 without any instruction from the user in the printing server 104. The CPU 301 executes the instruction without notifying the mobile terminal 101 of the status (the occurrence of an error) notified from the printer 105.

If the avoidance mode value is "0", the CPU 301 determines in step S1204 that the avoidance mode is invalid, and terminates the processing. Note that when terminating the processing in step S1203 or S1204, the CPU 301 may notify the mobile terminal 101 of the occurrence of an error in the printer 105. That is, if it is not designated that an error in the printer 105 should be automatically resolved, or the error that has occurred is not an error which can be automatically resolved, the CPU 301 may notify the mobile terminal 101 of the occurrence of an error.

As described above, in this embodiment, the printing server 104 generates print data from the print target file attached to the electronic mail received from the mobile terminal 101 via a network, and makes the printer designated in the electronic mail execute printing based on the print data. In addition, in a case where the printing server 104 has been notified, from a printer, of the occurrence of an error during the execution of printing based on print data, if it has been designated in the received electronic mail that the error should be automatically resolved, the printing server 104 instructs the printer to automatically resolve the error that has occurred. At this time, the printing server 104 issues such an instruction to the printer without notifying the mobile terminal 101 of the occurrence of an error in the printer.

With this operation, when making a printer execute printing based on the electronic mail received from a mobile terminal, the printing server can allow the printer to continue printing by resolving an error without interrupting the printing if the error can be automatically resolved in the printer. Even if some kind of error occurs in a printer, it is possible to make the printer continue printing as long as it can.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-077801, filed Mar. 29, 2012, which is hereby incorporated by reference herein in its entirety.

What is claimed is:

1. An information processing apparatus which is configured to communicate with a printing apparatus via a network, the apparatus comprising:
    a reception unit configured to receive, from a mobile terminal, electronic mail to which a print target file is attached and in which a printing apparatus to print the file is designated;
    a print control unit configured to cause a printing apparatus designated in the electric mail to execute printing based on the print target file attached to the electric mail;
    a detection unit configured to detect an error which occurs during execution of printing by the designated printing apparatus; and
    an instruction unit configured to instruct, if the electronic mail received by the reception unit includes information instructing to skip an error which occurs in the designated printing apparatus, the designated printing apparatus to continue printing by skipping the error detected by the detection unit in accordance with a type of the error.

2. The apparatus according to claim 1, wherein if the electronic mail received by the reception unit includes information instructing to skip the error and the error is an error which can be automatically skipped, the instruction unit instructs the designated printing apparatus to continue printing by skipping the error.

3. The apparatus according to claim 2, further comprising a notification unit configured to notify the mobile terminal of occurrence of the error if the electronic mail received by the reception unit does not include information instructing to skip the error or the error is not an error which can be automatically skipped.

4. The apparatus according to claim 1, further comprising a holding unit configured to hold a printing setting in advance for each printing apparatus serving as a control target via the network,
wherein the print control unit causes a printing apparatus designated in the electronic mail to execute printing based on a print setting, of print settings held by the holding unit, which corresponds to the designated printing apparatus.

5. The apparatus according to claim 4, wherein an error which can be automatically skipped includes a state in which a remaining amount of toner for printing in the designated printing apparatus is small, a state in which a sheet size designated by the print setting differs from a size of a sheet held in a feeding unit of the designated printing apparatus, and a state in which a sheet type designated by the print setting differs from a type of sheet held in the feeding unit of the designated printing apparatus.

6. The apparatus according to claim 1, wherein information indicating a printing apparatus to execute printing of the print target file and information indicating that an error which occurs in the printing apparatus is to be automatically skipped are written in a subject field or text of the electronic mail.

7. A method of controlling an information processing apparatus which is configured to communicate with a printing apparatus via a network, the method comprising:
receiving, from a mobile terminal, electronic mail to which a print target file is attached and in which a printing apparatus to print the file is designated;
causing a printing apparatus designated in the electric mail to execute printing based on the print target file attached to the electric mail;
detecting an error which occurs during execution of printing by the designated printing apparatus; and
instructing, if the received electronic mail includes information instructing to skip an error which occurs in the designated printing apparatus, the designated printing apparatus the designated printing apparatus to continue printing by skipping the detected error in accordance with a type of the detected error.

8. A non-transitory computer-readable storage medium storing a computer program for causing a computer to execute steps of the method for controlling the information processing apparatus according to claim 7.

* * * * *